United States Patent

[11] 3,622,701

[72] Inventor Gerald Marvin Gardner
Saffrow Walden, England

[21] Appl. No. 846,564
[22] Filed July 31, 1969
[45] Patented Nov. 23, 1971
[73] Assignee Standard Telephones and Cables Limited
London, England
[32] Priority Aug. 15, 1968
[33] Great Britain
[31] 39,006/68

[54] CHARACTER GENERATION SYSTEM
23 Claims, 7 Drawing Figs.

[52] U.S. Cl. .......... 178/30
[51] Int. Cl. .......... H04l 15/34
[50] Field of Search .......... 178/17.5, 30, 15, 90; 340/324.1

[56] References Cited

UNITED STATES PATENTS

| | | | |
|---|---|---|---|
| 2,930,847 | 3/1960 | Metzger | 178/30 X |
| 3,336,587 | 8/1967 | Brown | 340/324.1 |
| 3,387,269 | 6/1968 | Hernan et al. | 178/30 X |
| 3,413,610 | 11/1968 | Botter et al. | 340/324.1 X |
| 3,453,387 | 7/1969 | Bagley | 178/17.5 |

*Primary Examiner*—Kathleen H. Claffy
*Assistant Examiner*—William A. Helvestine
*Attorneys*—C. Cornell Remsen, Jr., Walter J. Baum, Paul W. Hemminger, Percy P. Lantzy, Philip M. Bolton, Isidore Togut and Charles L. Johnson, Jr.

ABSTRACT: A character generation system for use with high-speed printing/display apparatus. A cyclic code generator is provided which includes electrical delay means such as an N-stage shift register for cyclically generating, in synchronism with the application of the character data to the system, an N-bit serial code representative of the characters in the system's repertoire. Means are provided for selecting the pertinent portions of the N-bit serial code corresponding to the received data and directing same to character forming means during each cycle of the generator. Further provision is made for variable character and word spacing.

Inventor
GERALD M. GARDNER
By Mark L. Hopkins
Agent

Inventor
GERALD M. GARDNER
By [signature]
Agent

Inventor
GERALD M. GARDNER
By [signature]
Agent

Inventor
GERALD M. GARDNER
By [signature]
Agent

CHARACTER GENERATION SYSTEM

BACKGROUND OF THE INVENTION

The invention relates to a character generation system having particular but not necessarily exclusive application to electrographic printing and/or display apparatus.

Electrographic printing and/or display apparatus is defined as apparatus of the kind wherein the recording surface of either a print drum or band is selectively magnetized or electrostatically charged to form a pattern or latent image thereon representative of information contained in a signal applied to the apparatus, and wherein the print drum or band is passed through or relative to an applicator containing a printing medium that is attracted to the electromagnetically or electrostatically formed latent image to develop same and to form an image which may be viewed at a display position and/or transferred to a permanent record by printing means which form part of the apparatus.

In general, character generation systems employed with electrographic prining and/or display apparatus of the printing as hereinbefore defined utilize a physical element, for example, a diode, a wire threaded through the cores of a ferrite store, or an area of a waffle iron store, to represent each part of every possible character in the system's repertoire.

SUMMARY OF THE INVENTION

According to the broader aspects of the invention there is provided in a character generation system, which includes line input means for assembling the data applied to the system into coded characters and storing it for later use, and which is coupled to character forming means which may include a series of magnetic recording heads for generating the characters on a mangnetizable surface in dot matrix form, a cyclic code generator which includes electrical delay means for cyclically generating in synchronism with the assembly of the code characters an N-bit serial code representative of the system's repertoire of characters and a character reference code counter which provides a parallel code cyclic index of the N-bit parallel code and is synchronized therewith, and code comparator and gating means for comparing a character code received from the line input means with the cyclic index in order to gate-out the pertinent portion of the N-bit code to the character forming means when a coincidence is reached in the comparator.

BRIEF DESCRIPTION OF THE DRAWINGS

The foregoing and other features according to the invention will be better understood from the following description taken in conjunction with the accompanying drawings, in which.

DESCRIPTION OF THE PREFERRED EMBODIMENTS

Figure 1:
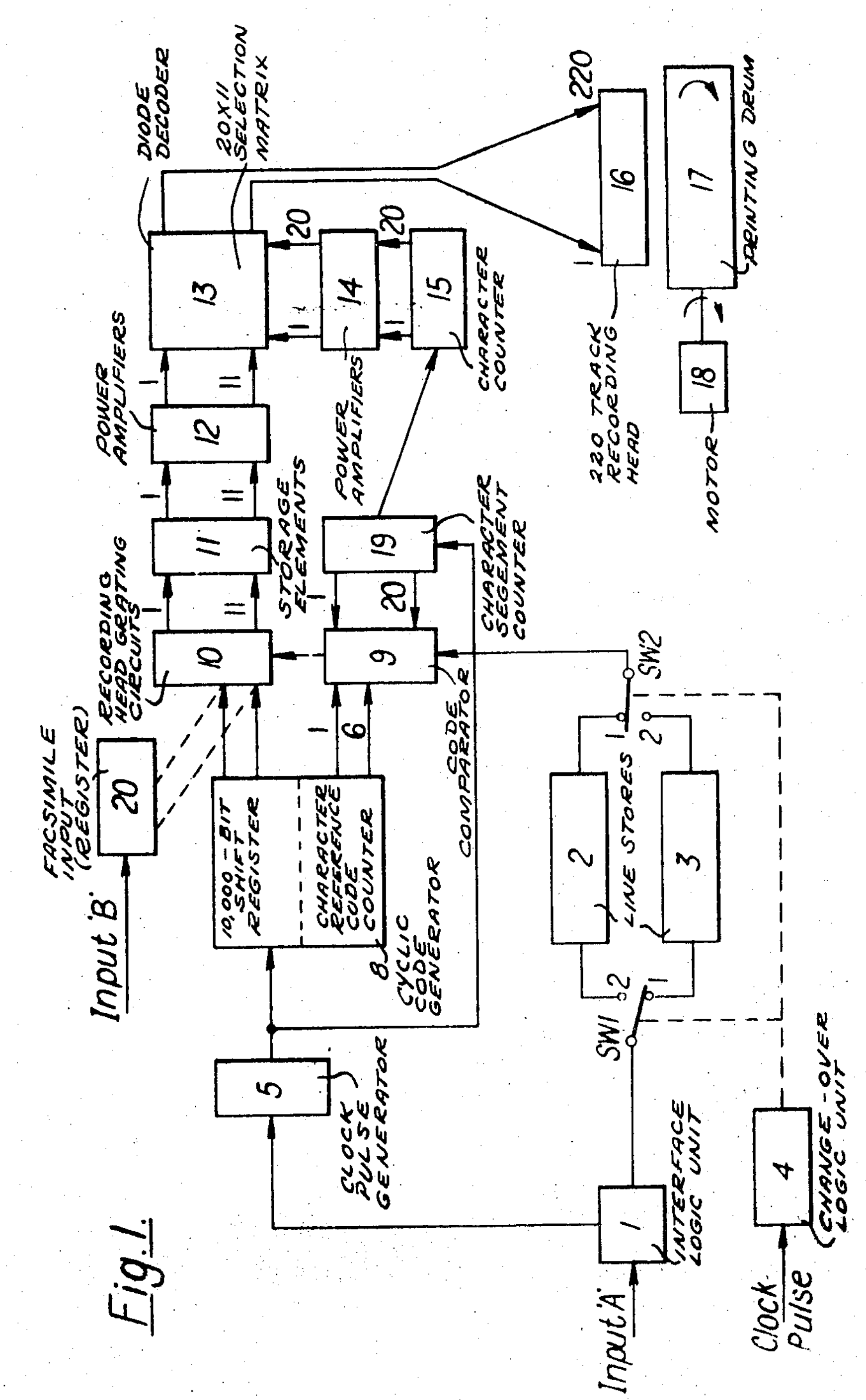
FIG. 1 diagrammatically illustrates in the form of a block diagram a character generation system according to the invention.

The character generation system according to the invention which is illustrated in the drawing according to FIG. 1 is arranged by way of example to provide the facilities to drive a 220 track (20 characters) recording head 16 at any speed up to speeds of the order of 50,000 characters per second although it could be adapted for use with a cathode ray tube display. This character speed corresponds to 500 lines of 100 characters per second. Alternatively when the recording head 16 forms part of an electrographic printing and/or display apparatus (as shown in FIG. 1), wherein it forms the characters as charge patterns on the recording surface of a printing drum 17 which is being rotated by a motor 18, a comparable printing speed of 83 inches of paper per second at six lines per inch may be achieved.

Provision is made in the system to include facsimile reception logic with half tone facilities to work over a similar paper speed range to the one outlined in the preceding paragraph.

The basis of the character generation system according to the invention is a cyclic code generator 8 which includes a shift register operating either in a preset mode or in a feedback mode of operation. By using suitable feedback functions the shift register may be used to generate a code cycle with a length greatly in excess of the number of shift elements employed in the register.

It is essential to provide a buffer store section for the character generation system which has the capacity of at least one complete character line if repeated retransmission is to be avoided. With only one character line store it is necessary to refill this store during the time taken to move the drum 17 a distance equal to the interline gap. This time is obviously restricting and requires the printers to have a high priority rating in a computer complex and also requires a high data transmission rate between the printer and a central processor.

This situation is overcome to a degree by the character generation system shown in the drawing according to FIG. 1 wherein two line stores 2 and 3 are provided which are arranged such that one of the line stores is filled from the data source via an interface logic unit 1, while the data contained in the other line store, is being acted upon.

It should however be noted that the character generation system according to the invention is not limited to the use of only two line stores, any number of line stores may be utilized. It may be necessary for certain applications to use more than two line stores, for example, when the character generation system is used in conjunction with electrographic printing and/or display apparatus having a printing drum which is being rotated at a relatively higher speed than its counterpart in a system utilizing only two line stores. In this case the time between the detection of the end-of-message signal and the printing of the final line of characters is not long enough to stop the drum rotating at the end of the message, therefore it is necessary to increase the store capacity of the system by providing a plurality of line stores. The extra storage capacity would be such that the time which elapses between the detection of the end-of-message condition and the generation of the last character of the message is sufficient to stop the drum rotating at the correct instant.

All incoming data, for example, from a tape reader or line, appearing at the input 'A' passes through the interface logic unit 1 wherein the character rate waveform is extracted, the characters are assembled for parallel transfer to line stores 2 or 3 and the transfer to the line stores 2 or 3 is initiated. Two data stores are required since data will be arriving at the input 'A' while the last-received data is being printed.

In addition, the interface logic unit 1 detects the start-of-message and the end-of-message conditions as well as other function codes used to signal the printer and control the data sources.

The character rate waveform extracted by the interface logic unit 1 is applied to a clock-pulse generator 5 the output of which is applied to the cyclic code generator 8.

The two line stores 2 and 3 alternate their functions, i.e. one is receiving characters while the other is being readout under the control of a changeover logic unit 4. This action is illustrated in the drawing according to FIG. 1 where, for example, store 3 is shown connected to the input 'A' via position one of a two-position switch SW1 and the interface logic unit 1, and store 2 is connected to a code comparator 9, which ultimately controls character formation, via position one of a two-position switch SW2. The changeover logic unit 4 causes the switches SW1 and SW2 to be switched to the other of the two positions, i.e. contact position 2, when one line has been printed from one data store and the other data receiving store has been filled with the next line to be printed, thereby initiating the function interchange. When this occurs the line store 2 is connected to the input 'A' and the line store 3 is connected to the code comparator 9.

It should be noted that the switches SW1 and SW2 could in practice be provided by electronic switching units.

The recording head 16 forms the characters 20the surface of the print drum 17 as charge patterns which are in the form of dot patterns. When recording the dot pattern on the drum surface to form a line of characters a series of operations are required. The top line or row of dots of the first character of that line must first be formed, followed by the top row of the second character, and so on. After writing the top row of dots of the final character, i.e. the 20th character for the 20-character line example quoted above, the drum 17 will have been rotated sufficiently by the motor 18 to permit the recording of the second line or row of dots of each character in the line, and so on. The procedure, in order for example to form a 220×20 dot matrix, i.e. each character being 11×20 dots, is followed for 20 rows of dots, thus forming the 20-character line of text from the 220×20 dot matrix. Recording of the next line in the same manner may then begin. The above series of operations necessitates the recirculation of the line of characters stored in the line store 2,3 (in a nondestructive mode of readout) 20 consecutive times, corresponding to the 20 rows of dots which make up each character, which recirculation in turn necessitates a like repetition in the associated character generation circuitry in order to record a line of text completely.

In one arrangement of the character generation system according to the invention character translation is effected by a continuously cycling code generator 8 which includes a preset shift register. The preset shift register, which would be arranged to contain details of the complete font, may take the form illustrated in the drawing according to FIG. 2.

The number of stages of the shift register is determined by the number of elements, i.e. number of dots, in the complete repertoire of the character generation system. For example, for 20×10 element characters in a 50-alphanumeric character repertoire, 10,000 stages would be required. It is obvious that a single shift register could perform this task or a number of shift registers connected in parallel could be utilized if operated at a reduced clock rate.

Figure 2:
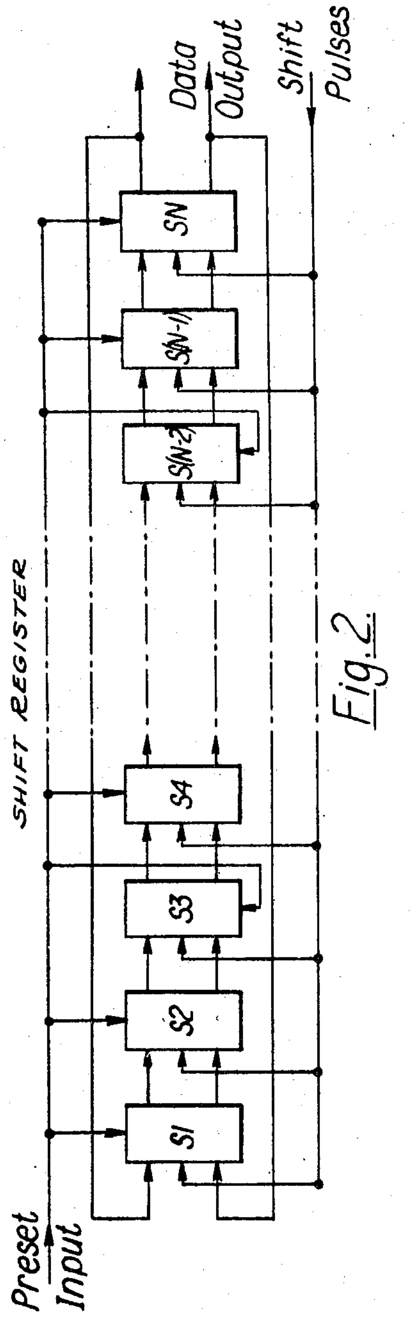
FIG. 2 diagrammatically illustrates in the form of a block diagram one arrangement for part of a cyclic code generator which forms part of the character generation system illustrated in the drawing according to FIG. 1.

The N-stages of the shift register which are in practice provided by bistable devices are shown symbolically in the drawing according to FIG. 2 as blocks S1, S2, S3...SN. Each of the N-stages is connected to a source of shift pulses, i.e. the output of the clock pulse generator 5, the rate of the shift pulses determining the operating rate of the shift register, and to a source of pulses which provide a preset input signal to each of the N-stages at the start of a character generation mode of operation, i.e. the stages are set to either a "1" state or a "0" state. Once preset, an N-bit serial code will be generated at the data output terminal of the Nth-stage, i.e. stage SN, at a rate determined by the shift pulses. The shift register is kept in a continuous mode of operation, as shown in FIG. 2, by applying the output of the last stage SN to the input of the first stage S1, thus the N-bit serial code will be continuously generated at the data output terminal.

In the quoted example, the shift register will contain 10,000 stages, i.e. N=10,000. Thus a 10,000-bit serial code will be generated at the output of the last stage of the register, with each character of the 50-character repertoire being represented by one of 50 successive 200-bit sections of this serial code. The 200-bit serial code representative of a character can be further subdivided in that each of the 20 rows of elements of the character is represented by one of 20 successive 10-bit sections of this 200-bit serial code. Each of the 20 rows of elements will hereinafter be referred to as segments.

The data output of the shift register section of the cyclic code generator 8, containing details of the complete font of the character generation system, is applied to the inputs of the recording head gating circuits 10 (FIG. 1) each time it is required to generate a segment of a character. Thus, assuming by way of example that the character rate is one character/second, i.e. the 20 characters in the quoted example are applied at input 'A' and recorded from a line store 2,3 at a rate of one character every second, thereby requiring 20 seconds for complete recordation of a line of characters, then the complete repertoire of 50 alphanumeric characters must be presented to the gating circuits 10 every one-twentieth of a second, i.e. since, in the quoted example, each of the 20 characters in the line is comprised of 20 segments, thereby requiring that 400 segments be generated in order that the complete line of characters be recorded, and since the entire 10,000 bit serial code must be presented at the inputs to the gating circuits 10 during the generation of each of the 400 segments, the shift pulse rate as obtained from the clock pulse generator 5 must be such that the serial code at the data output terminal is generated at a rate of 200,000 bit/second.

In order that the selected segment of a particular character may be passed through the gating circuits 10, a character reference code counter is provided within the cyclic code generator 8 which would be arranged for the quoted one character/second rate to cyclically generate every 1/20th of a second its entire complement of 50 character codes, for example six-bit parallel character codes, which represent in one-to-one correspondence the 50 alphanumeric characters in the system's repertoire. This series of 50 character codes is applied in a cyclic manner to the code comparator 9. The 50 six-bit character codes are synchronized with the 10,000 -bit serial code such that during the period of time a 200-bit section of the serial code representative of a particular character appears during each sift register cycle at the inputs of the gating circuits 10, the corresponding six-bit parallel code of that particular character from the character reference code counter appears at the input of the code comparator 9.

A character segment counter 19 is provided for the code comparator 9 which, for the above quoted line store capacity of twenty alphanumeric characters, would be arranged to apply a series of 20 gating pulses per second to the code comparator 9 each time there is to be generated a character segment. This series of gating pulses, each pulse being capable of gating 10-bits (one segment) of the 10,000 -bit serial code, is synchronized with the 10,000-bit serial code in a manner such that, during the period of time that a 200-bit section of the serial code representative of a particular character appears at the inputs of the gating circuits 10, a separate one of the 20 gating pulses is applied to the code comparator 9 in synchronism with the corresponding 10-bit subsection of that 200-bit section which is representative of a segment of the character which this 200-bit section represents.

In order to obtain the necessary data sequences into the recording head 16 to record all segments of each character, the characters must be recyclably read from the line stores 2,3 in sequence and in the code comparator 9. Thus in actual operation, the counter 19 applies twenty gating pulses every second to the code comparator 9 in a manner such that the phase relationship between this series of pulses and the 10,000-bit serial code changes every second by an amount equal to the time interval of 10-bits of the serial code, thereby facilitating the formation of the subsequent segments (rows) of each character of the line of 20-characters on the drum surface in the manner outlined in a preceding paragraph.

It can therefore be seen from the above that when a character is selected and taken from the line store and placed into the code comparator 9, it is compared with each one of the 50 character codes applied to the comparator 9 by the cyclic code generator 8, and when the correct code is established a gating pulse obtained from the character segment counter 19 is passed through the code comparator 9 and applied to the gating circuits 10, thereby allowing a 10-bit segment of the 200-bit section of the 10,000-bit serial code, which is representative of the required segment of the selected character, to be passed through the gating circuits as a 10-bit parallel code. Having obtained the required code it is fed to the power amplifiers 12 by way of storage elements 11. These units in conjunction with a 20 ×11 selection matrix, i.e. a diode decoder 13, and character counter 15 drive the 220-track recording head 16. The added 11 dot in each dot row of the 20 ×11 character matrix is included by gates 10 for purposes of providing spacing between successive characters upon recordation.

The recording head tracks are driven completely in the serial mode, hence the track coordinate switches and the character coordinate switches which form character counter 15 are carrying identical currents. The operating speed of the system may be increased by driving all the track coordinate switches simultaneously, thereby eliminating the need for serialization of the track's switches in which case the storage elements 11 would not be required. This may reduce costs but does require the character switches to carry a maximum of eleven track currents.

In operation, the character counter 15 causes a current waveform to be applied to the 20 ×11 selection matrix of the diode decoder 13 via each one of the 20 output wires in sequence, these pulses being amplified by a power amplifier 14 before they are applied to the diode decoder 13. The current waveform on any given one of the 20 input wires selects the information passed through the gating circuits 10 which is representative of a segment of one of the 20 characters in each line of text, and ensures that this segment of information is passed via the correct ones of the 220 input wires to the recording head 16.

IT is therefore necessary as shown in FIG. 1 for the character counter 15 to be synchronized with the operation of the character segment counter 19 in order to ensure that the interrogation of a character at the code comparator 9 coincides with the character counter 15 selecting this character to be passed to its appropriate tracks of the 220-track recording head 16. The character counter 15 will therefore make one complete cycle of twenty pulses, that is a current waveform will be passed via each one of the twenty input wires to the decoder 13 in succession to coincide in one-to-one relationship with the appearance of each of the 20 characters in the line of text appearing at the code comparator 9, and in coincidence with the application of each one of the 20 gating pulses on one of the 20 input wires applied to the code comparator 9 from the character segment counter 19, in order to record in proper succession on the surface of the printing drum 17 those dots in any one of the 20 rows of 220 dots which comprise part of each one of the 20 characters in a given line of characters.

In the case of facsimile reception, the repeated code translation operations are not necessary since the data applied via the input terminal 'B' to a facsimile input register 20 would be in the correct form for applying directly to the gates 10. The operation of the system after the gates 10 is exactly the same as described in preceding paragraphs. The provision of the facsimile reception together with the normal "dense code" working enables either input 'A' or input B' to be used thereby allowing the facsimile facility to be included at any desired point during the recording of the data applied at the input 'A' by merely cutting off input 'A' and switching input 'B' into circuit.

The preset shift register shown in the drawing according to FIG. 2 could in practice be of the large scale integration variety, for example a MOST shift register, and therefore a more economical solution of the provision of this method of code generation would be to utilize a feedback shift register or M-sequence generator.

Figure 3:
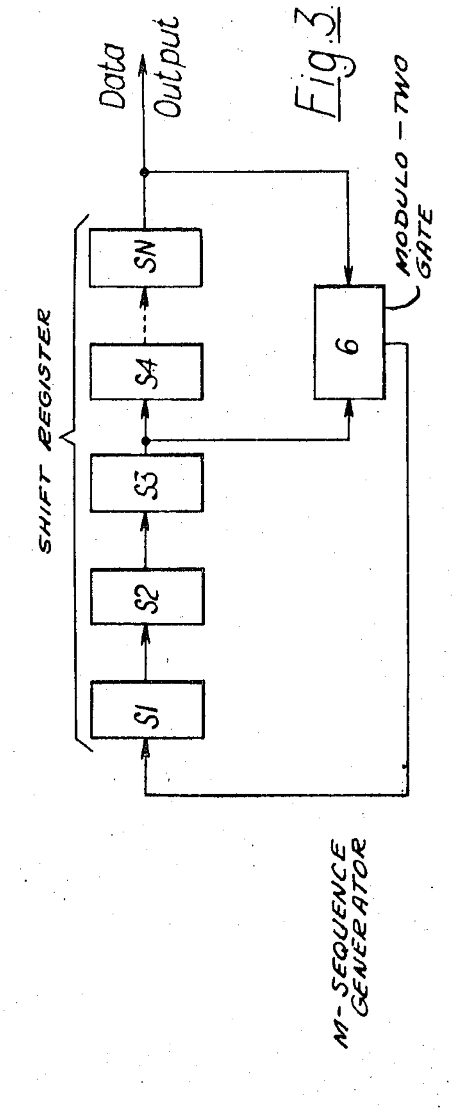
FIG. 3 diagrammatically illustrates in the form of a block diagram another arrangement of part of the cyclic code generator which forms part of the character generation system illustrated in the drawing according to FIG. 1.

An M-sequence generator which may form part of the cyclic code generator 8 shown in the drawing according to the FIG. 1 is illustrated in its simplest form in the drawing according to FIG. 3. As shown in FIG. 3, the M-sequence generator comprises a basic N-stage shift register represented by the interconnected blocks S1, S2...SN to which a modulo-two gate 6 has been added. These gates may be connected to various stages of the register. The outputs of the stages are fed to the gates, and the outputs of the gates are fed to some other stage of the register, so that a single or multiple closed loop is formed.

It is not proposed to go into the functional aspects of the M-sequence since it is assumed that this information is readily available to persons skilled in the art, see for example, the following articles: (a) "Generation and Properties of Maximum-Length Sequencies" by W. D. T. Davies in the June July and Aug. 1966 issues of "Control"; and (b) "Generation of Delayed Replicas of Maximum-Length Linear Binary Sequences" by S. H. T.s20 - Proc. I.E.E., Vol. 111, No. 11 Nov. 1964.

It will be seen from the above that by using suitable feedback functions the register may be used to generate a code cycle with a length greatly in excess of the number of shift elements in the chain. Hence by correct selection of the feedback functions this shift register may be induced to generate the required character forming sequence for gating with character codes etc. in a manner as previously outlined, yet use far fewer sift elements than would be required with the shift register arrangement shown in the drawing according to FIG. 2.

As before the register would be preset to ensure correct starting and any number may be used in parallel to relieve the gating and speed requirements of the character generation system.

Figure 4:
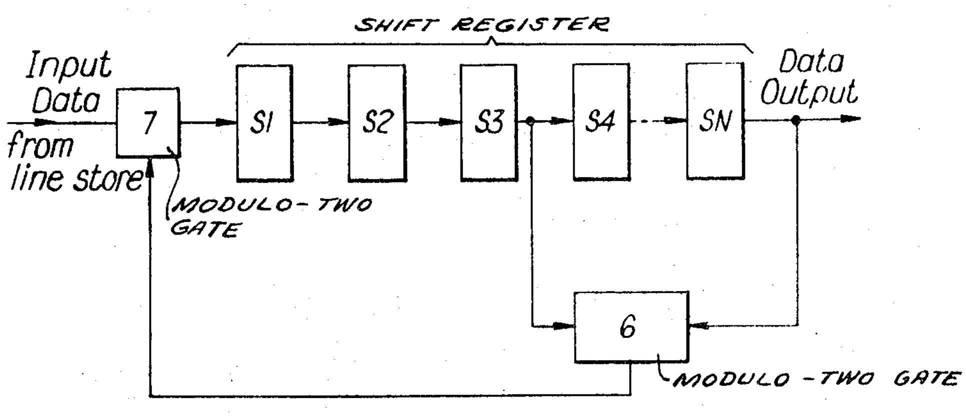
FIG. 4 diagrammatically illustrates an alternative arrangement for that part of the cyclic code generator illustrated in the drawing according to FIG. 3.

Instead of presetting the shift elements of the M-sequence generator, the character data obtained from the line store may be applied directly to the generator, for example, in a manner as shown in the drawing according to FIG. 4, i.e. via a modulo-two gate 7, and the generator would be arranged to provide at the data output thereof for each coded character input a distinct 200-bit serial code representative of that character. The number of closed loops that are utilized within the M-sequence generator, in order to develop this 200-bit serial code, may be controlled by the input data, i.e. for each input character code the required gates of the generator would be rendered operative by that input character code, thereby establishing the correct closed-loop pattern for the generation of the selected character serial code. It should be noted that the serial coded output signal of the generator may be larger than 200-bits but the generator would be arranged such that the correct 200-bit pattern is identifiable.

Figure 5:
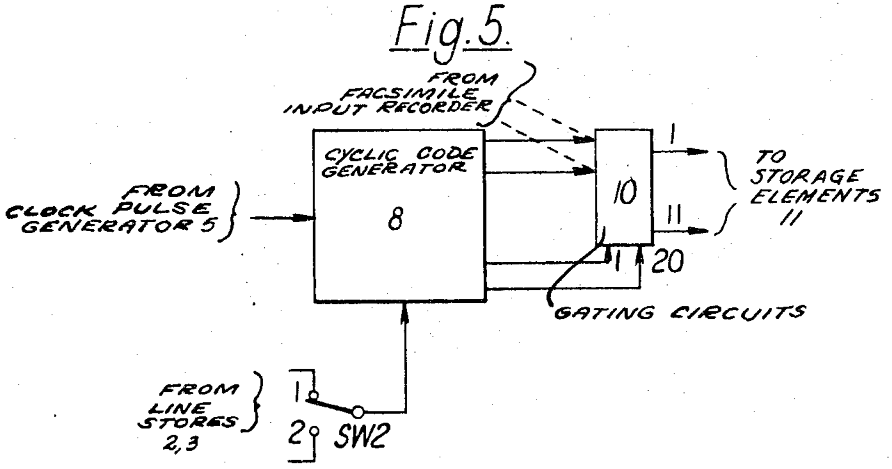
FIG. 5 diagrammatically illustrates in the form of a block diagram a modified arrangement of part of the character generation system illustrated in the drawing according to FIG. 1.

Since the actual character code as obtained from the line store 2,3 causes the generation of the 200-bit serial code for application to the gating circuits 10, the character generation system shown in FIG. 1 would need to be modified in a manner shown in the drawing according to FIG. 5 wherein it can be seen that the code comparator 9 has been eliminated. The character reference code counter which forms part of the cyclic code generator 8 would for this system be arranged, for a line store capacity of 20 alphanumeric characters to apply a series of 20 gating pulses on each one of the input wires to the gating circuits which are marked 1 to 20, i.e. one input wire for each of one of the 20 segments of a character. This series of gating pulses, each one of which is capable of gating ten - bits of the 200-bit serial code, are synchronized with the character rate waveform in a manner such that during the period of time that each one of the 20 200-bit serial codes appears at the inputs of the gating circuits 10, a separate one of the 20 gating pulses on one of the 20 input wires is applied to the gating circuits 10 in order that the required segment of a selected character may be passed through the gating circuits 10. Thus in operation the character reference code counter for the cited circumstances cyclically applies 20 gating pulses at a rate of one pulse per second on each one of the 20 input wires to the gating circuits 10, thereby facilitating the formation of the line of 20 characters on the drum surface in the manner outlined in a preceding paragraph. The phase relationship between each series of 20 gating pulses is such that each series of 20 gating pulses on one of the wire leads, in time, the preceding series of 20 gating pulses on an adjacent wire by an amount equal to the time interval of 10 -bits of the 200-bit serial code.

It should be noted that the shift registers shown in the drawings according to the FIGS. 2 to 4 may be replaced by a delay line having tappings arranged along its suitably arranged to facilitate the making of the necessary interconnections and the application of the appropriate input, shift and feedback signals. These arrangements would function in the same manner as outlined in preceding paragraphs for the shift register arrangements.

Figure 6:
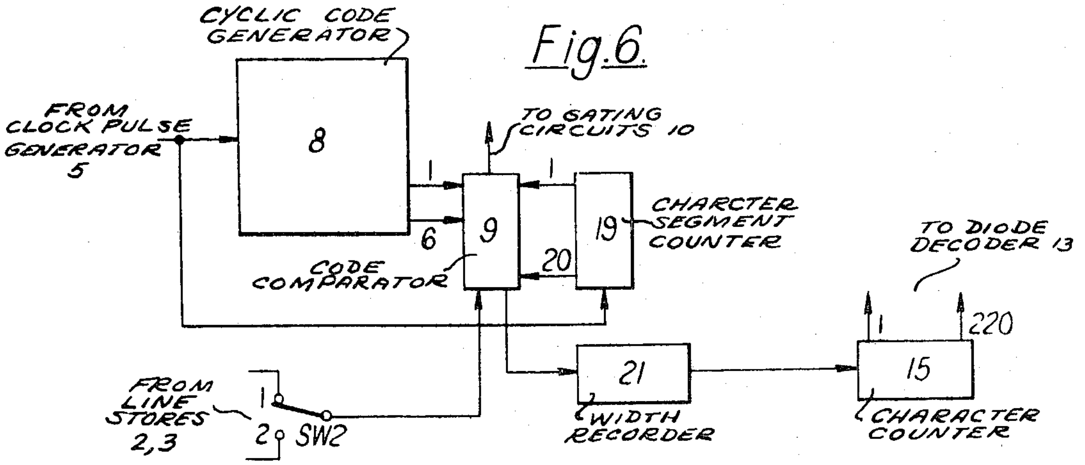
FIG. 6 diagrammatically illustrates part of the block diagram illustrated in the drawing according to FIG. 1 together with means for varying the spacing between characters.

It may be necessary for certain applications where line justification is important to include means in the character generation system for varying the spacing between characters. Referring to the drawing according to FIG. 6, part of the block diagram shown in the drawing according to FIG. 1 is illustrated therein together with means for varying the spacing between characters. In this arrangement the code comparator 9, when a character selected from the line store has been identified with one of the character codes applied to the code comparator 9 by the cyclic code generator 8, provides an output signal representative of the selected character.

This signal is applied to a width recorder 21 wherein it is translated and applied to the character counter 15 which is adapted to operate in incremental steps equivalent to the spacing between dot centers and not in fixed character increments as is the case in the system shown in the drawing according to FIG. 1. The recorder 21 applies a signal which is a function of the width of the character appearing at the code comparator 9 to the counter 15 to instruct it to step along an appropriate number of dot increments in order to channel the character data representative of a selected subsequent character which is to be generated to the appropriate tracks of the recording head 16 thereby ensuring that the desired intercharacter spacing is obtained.

Figure 7:
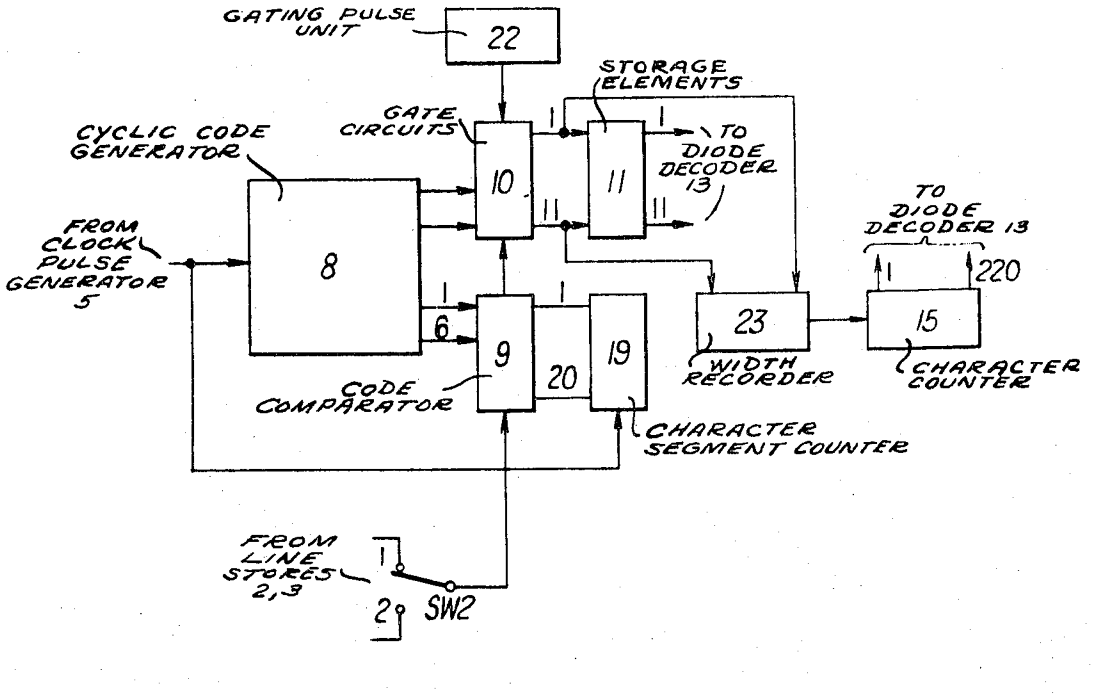
FIG. 7 diagrammatically illustrates part of the block diagram illustrated in the drawing according to FIG. 1 together with other means for varying the spacing between characters.

Alternatively, the provision of variable character spacing may be provided by the arrangement illustrated diagrammatically in the drawing according to FIG. 7. Referring to this FIG., part of the block diagram shown in the drawing according to FIG. 1 is illustrated therein together with means for varying the spacing between characters. In this arrangement the recording head distribution logic of the character generation system is controlled by the character itself in that the possible 10-bit parallel output signal of the gating circuits 10 which are representative of character segments are also connected to the inputs of a width recorder 23, the output of which is connected to the counter 15 and a gating pulse unit 22 is provided for the gating circuits 10.

After the signal representative of a selected segment of a selected character has been passed through the gating circuits 10 and before the next character code appears at the inputs to the gating circuits 10, the gating pulse unit 22 is arranged, to apply a series of gating pulses to the gating circuits 10 in order to gate out the other segments of the selected character as possible 10-bit parallel output signal. The overall width of the selected character is the logical product of this possible 10-bit parallel output signal and the output signal previously obtained, as a segment of the character. This logical operation is performed by the width recorder 23; therefore the output of the recorder which is representative to the overall character width is applied to the counter 15 which is adapted to operate in incremental steps equivalent to the spacing between dot centers and not in fixed character increments as is the case in the system shown in the drawing according to FIG. 1.

The output of the width recorder 23 instructs the counter 15 to step along an appropriate number of dot increments in order to channel the character data representative of a selected subsequent character which is to be generated, to the appropriate tracks of the recording head 16 thereby ensuring that the desired intercharacter spacing is obtained. Alternatively, the gating of the other segments of the selected character may be achieved by arranging for the character segment counter 19 in association with the code comparator 9 to perform this task in which case the gating pulse unit 22 would no longer be required. With this arrangement the character segment counter 19 in association with the code comparator 9, after the signal representative of a selected segment of a selected character has been passed through the gating circuits 10 and before the next character code appears at the inputs to the gating circuits 10, would be arranged to cause gating pulses to be successively or simultaneously applied to the gating circuits 10 in order to gate out the other segments of the selected character for application to the width recorder 23. It will be appreciated that this method of varying the spacing between characters may also be employed in the system shown in FIG. 5.

The variable character spacing facilities outlined in preceding paragraphs are such that the spring between sets of characters which make up complete words for example would always be the same since the character code representative of a "-space" would cause a distinct coded signal to be applied to the width recorder which would be such as to cause the counter unit to step along the same number of dot increments. Thus in order to exercise greater control over the line justification facility it is necessary for the character code representative of a space to include details as to the required width of a particular space and for the width recorder to be able to detect and act on this information. This is achieved by arranging for the width recorder, when a character code representative of a space is taken from the line store, to detect the presence of the space code, i.e. by virtue of its distinctiveness, to cause the space code to be applied thereto at the instant of detection and to translate it into an input signal which is a function of the width of the space. This output signal would then be applied to the counter unit to instruct it to step along an appropriate number of dot increments in order to channel the character data to the appropriate tracks of the recording head. The line store must therefore for this arrangement be accessible from the width recorder.

The character generation system outlined in preceding paragraphs may be adapted for use with either of the magnetic recording heads outlined in copending U.S. Pat. application numbered 727,965 filed May. 9, 1968, 742,304 filed July 3 1968, and 740,138 filed June 26, 1968. For these applications the blocks 11 to 15 will not be required and the gating circuits 10 will need to be arranged to provide an N-bit serial coded output for application to the input drive logic for these recording heads. In the case of the above U.S. Pat. applications numbered 742,304 and 740,138, the N-bit serial coded output would be translated into a series of pulses of one polarity and decreasing magnitude, each one of the pulses being followed by at least one other pulse which is of the opposite polarity and lesser in magnitude.

The means outlined in preceding paragraphs for varying the spacing between characters may be utilized with either of the magnetic recording heads mentioned in the preceding paragraph by arranging for the output of the width recorder to be applied to the recording head's input drive logic which would be adapted to cause a delay, between the application of adjacent serial output signals therefrom to the recording head, sufficient to create the desired spacing between adjacent characters.

Instead of generating a line of characters in the manner outlined in preceding paragraphs, it may be advantageous for certain applications to generate a complete character during each logic operation instead of only a segment of the character in which case the line stores and the changeover logic unit would not be required. Thus with this arrangement the output of the interface logic unit could be applied directly to the system and the counting and gating circuits would be arranged to operate in a manner similar to the counting and gating circuits outlined in preceding paragraphs except that the application of a character code to the system will result in 20 (for the quoted example) successive segments of the character being applied to the recording head via the system logic instead of only one segment thereby resulting in the generation of the complete character. The means outlined in preceding paragraphs with reference to FIGS. 6 and 7 for varying the spacing between characters may be utilized in the same manner with this arrangement except that in one arrangement of the system shown in FIG. 7, the gating pulse unit 22 is not required since all 20 character segments are gated out of the gating circuits 10 and will therefore be applied to the width recorder 23 which will be adapted to obtain the logic product of these inputs and provide an output as before representative of character width.

I claim:

1. A character generation system comprising:

a. input means for storing at least one line of received coded characters and for providing a cyclic read out thereof;

b. a cyclic code generator including first means for cyclically generating in synchronism with said input means an N-bit serial code representative of the characters in the system's repertoire, with each of the characters being comprised of a predetermined number of successive segments of said N-bit code, and second means cyclically generating in synchronism with said first means a series of M reference codes indexing the N-bit serial code of said first means relative to the characters represented therein;

c. third means coupling said cyclic code generator and said input means for selecting from said N-bit serial code, in response to a character code readout from said input means, a segment portion of said N-bit code representative of the readout character; and d. character forming means, responsive to said third means and synchronized with said input means and said first means, for directing to recording means the segment portions of each of said line of coded characters, the cyclic reading of the contents of the input means being repeated until segments representative of the complete form of each of said line of characters have been directed to the recording means via said character forming means.

2. The character generation system as claimed in claim 1 wherein said first means are provided by an N-stage shift register, 3. The character generation system as claimed in claim 2 wherein the output of the *N*th stage of said shift register is connected to the input of the first stage thereof, and wherein each one of said N-stages is connected to a source of shift pulses.

4. The character generation system as claimed in claim 3 further including a first modulo-two gate, one input thereof being connected to the output of the *N*th stage and the other input being connected to the output of another one of the N-stages of the shift register, with the output of said first modulo-two gate being connected to the input of said first stage.

5. The character generation system as claimed in claim 4 further including a second modulo-two gate, each one of the inputs thereof being connected to the output of a separate one of the N-stages of the shift register, while the output of said second modulo-two gate is connected to the input of one of the N-stages.

6. The character generation system as claimed in claim 5 wherein said coded characters readout of said input means are coupled to said cyclic code generator and are sequentially applied thereto at a rate of one every cycle of said N-bit code, and wherein said cyclic code generator is arranged such that each one of said N-stages of said shift register is preset by said coded characters.

7. The character generation system as claimed in claim 6 wherein said coded characters control the operation of said first and second modulo-two gates.

8. The character generation system as claimed in claim 1 wherein said third means includes gating circuits connected to the N-bit serial code output of said cyclic code generator and a gating pulse generator for applying at least one gating pulse to said gating circuits during each cyclic of said cyclic generation and in synchronism therewith, said gating pulse causing at least a segment of said N-bit serial code to be gated out of said gating circuits which is representative of part of the desired character.

9. The character generation system as claimed in claim 8 wherein said first means includes a character reference code counter for cyclically generating, in synchronism with the generation of said N-bit serial code, said series of M reference character codes representative of the M characters of system's character repertoire, and wherein said third means further include a character code comparator, coupled to said character reference code counter and to said input means, and coupled between said gating circuits and said gating pulse generator for comparing a character code readout of said input means with the cyclic M-reference code index of said reference counter means and providing upon coincidence therebetween at least one gating pulse to pass from said gating pulse generator to said gating circuits in predetermined synchronous phase relationship with said cyclically produced N-bit serial code, said gating pulse permitting said gating circuits to pass the segment of said N-bit serial code then present at the input thereto.

10. The character generation system as claimed in claim 9 wherein said input means include two line stores and a changeover logic unit, the two line stores alternating in function under the control of said changeover logic unit in a manner such that one store in being filled while the other is being readout, the interchange of said stores being initiated when the characters stored in one have been transferred to the character forming means and recorded completely and the other store has been filled with incoming data.

11. The character generation system as claimed in claim 9 wherein said character forming means include a selection matrix in conjunction with a character counter unit which is synchronized with said gating pulse generator for directing the output of said gating circuits to the appropriate input channels of said recording means.

12. The character generation system as claimed in claim 9 further including means for the reception of facsimile data.

13. The character generation system as claimed in claim 12 wherein said means for the reception of facsimile data comprise a facsimile input register which is interposed between the N-bit serial coded input to said gating circuits and a facsimile data input terminal.

14. The character generation system as claimed in claim 9 including means for varying the spacing between characters.

15 The character generation system as claimed in claim 14 wherein said means for varying the spacing between the characters includes a character width translator in operative arrangement with said character code comparator, wherein when a selected character code applied to the comparator coincides with the appropriate reference character code, said code comparator provides an output signal representative of the width of the selected character which is applied to said character width translator, and wherein the output of said character width translator is coupled to said character forming means for instructing the distribution logic thereof to channel the selected subsequent character segment to the appropriate input channels of said recording means in order to obtain the predetermined intercharacter spacing.

16. The character generation system as claimed in claim 14 wherein said means for varying the spacing between characters include fourth means for obtaining from said gating circuits, such time it is required to generate a character and after a first digital signal representative of part of a character has been obtained from said gating circuits, a second digital signal representative of the remainder of the said character, and fifth means for generating the logical product of said first digital signal and said second digital signal as a third digital signal which is representative of the overall width of the said character, wherein said third digital signal is applied to the distribution logic of the character forming means to instruct same to channel the character data representative of a selected subsequent character which is to be generated to the appropriate input channels of the recording means in order to obtain the desired intercharacter spacing.

17. A character generation system as claimed in claim 16 wherein said fourth means include a gating pulse unit for applying, after said first digital signal has been obtained, gating pulses to said gating circuits in order to cause said second digital signal or signals to be gated out of said gating circuits.

18. A character generation system as claimed in claim 16 wherein said fourth means are provided by the character generation system's gating pulse generator which is adapted to apply, after said first digital signal has been obtained, gating pulses to said gating circuits in order to cause said second digital signal or signals to be gated out of said gating circuits.

19. A character generation system as claimed in claim 16 wherein said fifth means are provided by a character width translator, the inputs of which are connected to the outputs of said gating circuits and the output of which is connected to the distribution logic of said recording means.

20. A character generation system as claimed in claim 19 including sixth means for varying the spacing between sets of characters.

21. A character generation system as claimed in claim 20 wherein said sixth means are provided by arranging for the character codes representative of spaces between sets of characters to include details as to the required space width and by adapting said character width translator to detect the presence of these space codes and to provide an output signal representative of the required space width for application to the distribution logic of said recording means.

22. A character generation system comprising:

a. input means for storing at least one line of received coded characters and for providing a cyclic readout thereof;

b. a cyclic code generator including first means for cyclically generating in synchronism with said input means an N-bit serial code representative of the characters in the system's repertoire with each of the characters being comprised of successive segments of said N-bit code, and second means cyclically generating in synchronization with said first means a series of M reference codes indexing the N-bit serial code of said first means relative to the characters represented therein;

c. gating circuitry coupled to said first means for receiving therefrom each of the cyclically presented segments of said N-bit serial code;

d. code comparator means coupled to said input means and to said second means for comparing a character code readout of said input means with the cyclic index of said second means and providing upon coincidence therebetween at least one gating pulse is predetermined synchronous phase relationship with said cyclically produced N-bit serial code, said gating pulse permitting said gating circuitry to pass segment of said N-bit serial code then present at the input thereto; and e. character forming means, responsive to said gating circuitry and synchronized with said input means and said first means, for directing to recording means the segment portions of each of said line of characters to be recorded, the cyclic reading of the contents of the input means being repeated until segments representative of the complete form of each of said line of characters has been directed to the recording means via said character forming means.

23. The character generation system according to claim 22 further including character segment counter means, coupled to said code comparator means, for providing in synchronism with said cyclic code generator said at least one pulse for gating said gating circuitry upon a coincidence obtained in said comparator means.

* * * * *